US005253886A

United States Patent [19]

Weege

[11] Patent Number: 5,253,886

[45] Date of Patent: Oct. 19, 1993

[54] WHEELCHAIR

[75] Inventor: Rolf-Dieter Weege, Kalletal, Fed. Rep. of Germany

[73] Assignee: Meyra Wilhelm Meyer GmbH & Co., KG, Fed. Rep. of Germany

[21] Appl. No.: 819,829

[22] Filed: Jan. 13, 1992

[30] Foreign Application Priority Data

Jan. 18, 1991 [DE] Fed. Rep. of Germany ....... 9100562

[51] Int. Cl.[5] ........................ B62B 11/00; B62M 1/14

[52] U.S. Cl. ........................................ 280/39; 280/42; 280/647

[58] Field of Search .................... 280/250.1, 304.1, 38, 280/39, 40, 42, 647, 649, 650, 657, 658, 644; 297/DIG. 4, 42, 44, 45, 46

[56] References Cited

U.S. PATENT DOCUMENTS 3,627,343 12/1971 Meger .................................. 280/39

4,422,660 12/1983 Costello et al. ..................... 280/647

4,457,535 7/1984 Takeuchi et al. .................... 280/647

4,641,848 2/1987 Ayers .................................. 280/647

4,861,056 8/1989 Duffy, Jr. et al. .................... 280/42

*Primary Examiner*—Richard M. Camby

*Attorney, Agent, or Firm*—Allegretti & Witcoff, Ltd.

[57] ABSTRACT

A collapsible wheelchair having a pair of opposed side frames connected by scissors cross bars and having a pair of vertical shafts, which terminate in handles connected to the rear end of the side frame. A pair of seat-supporting members telescope into the side frames and move up and down as the side frames are brought together to collapse the wheelchair. To reduce the frictional forces in the telescoping members, rollers are provided on the telescoping members which bear against the vertical shafts and roll up and down as the chair is folded from use to non-use positions and back again.

4 Claims, 3 Drawing Sheets

WHEELCHAIR

PRIOR ART

The brochure *MEYRA Wheelchairs and Rehabilitation Equipment* from MEYRA Wilhelm Meyer GmbH & Co. KG, Meyra-Ring, D-4925 Kalletal-Kalldorf, describes a wheelchair of the type in question. If such a wheelchair is to be folded up from the use position into the non-use or stored position, the side frames must usually be pressed together by means of handles mounted at the rear of the frames and which are normally used to move the wheelchair. This often poses problems because of the frictional forces in the telescoping guides, and this effect is even worse because of clamping and jamming effects due to misalignment of the side frames by the application of closing forces at the rear of the chair. Therefore, it is often possible to collapse the wheelchair only by raising manually the telescoping top parts of the side frames, which necessitates special handling or reaching around.

SUMMARY OF THE INVENTION

The object of this invention is to solve the problem inherent in the prior structures and to provide a collapsible wheelchair which folds from the use position to the non-use position with ease.

The object of this invention is accomplished by reducing the frictional forces in the telescoping guides, by supporting the tops of the side frames by contact rollers which bear against tubes or shafts that rise above the side frames and serve as handles for the wheelchair. The rollers run parallel to the vertical movement of the telescoping guides which move up from the side frames as the chair collapses. These rollers absorb a considerable portion of the compression forces applied to the side frames when the wheelchair is folded up and transmit these forces in a rolling fashion with a diminishing frictional force. Reduction of frictional forces in the guides facilitates the entire operation of collapsing the wheelchair.

The vertical bearing tubes against which the rollers bear extend upward above the side frames and are curved down to form handles. The bearing tubes thus do not result in any increase in cost and the cost of the contact rollers is very low. The rollers may be rotatably mounted on the ends of the seat-supporting tubes with their axes of rotation parallel to the axis of the seat-supporting tubes, which tubes are connected to the telescoping guides.

The invention will now be illustrated according to one embodiment.

IN THE DRAWINGS

Figure 1:
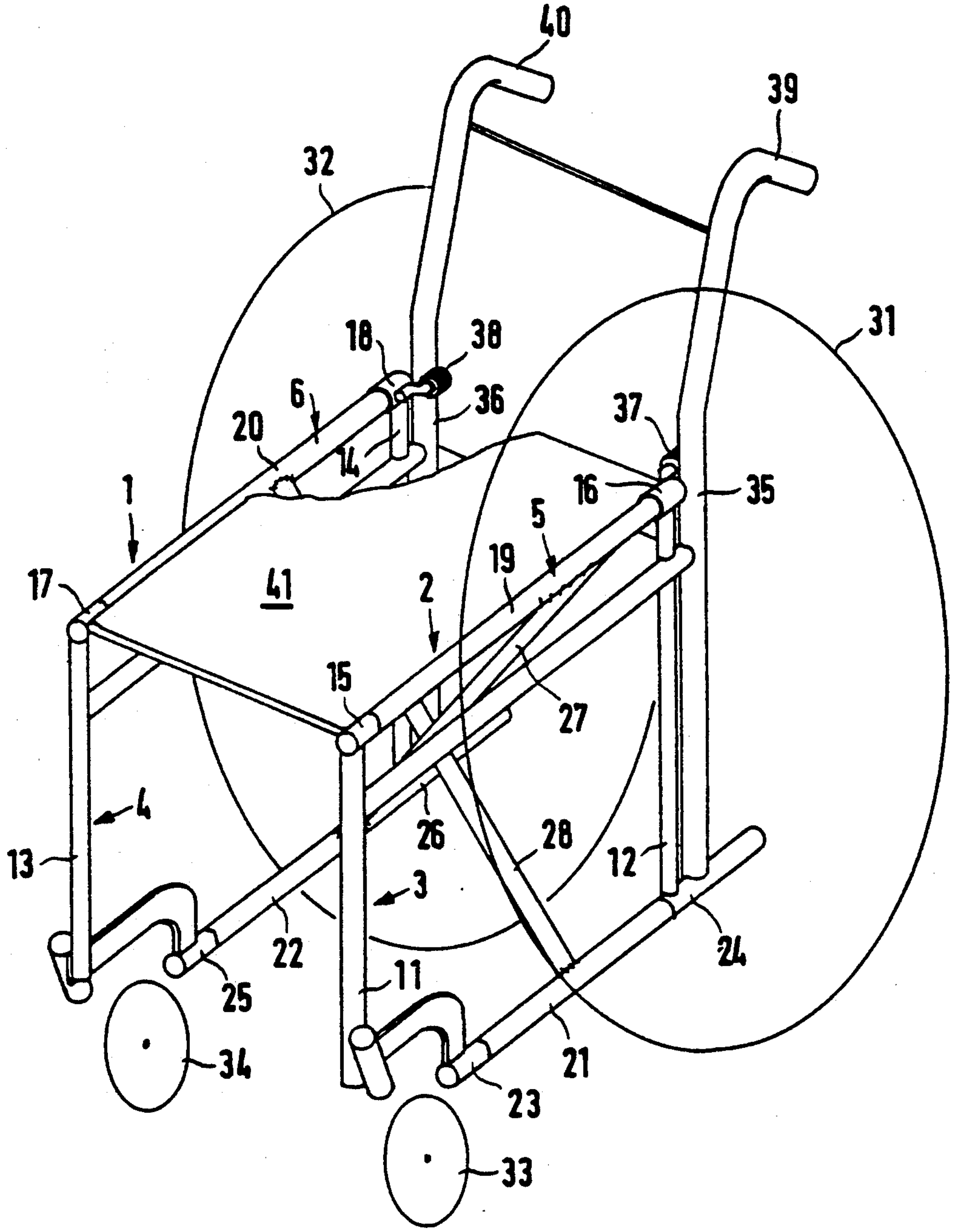
FIG. 1 is a schematic and perspective view of one embodiment of a wheelchair according to the invention, shown here in the ready-to-use position.
Figure 2:
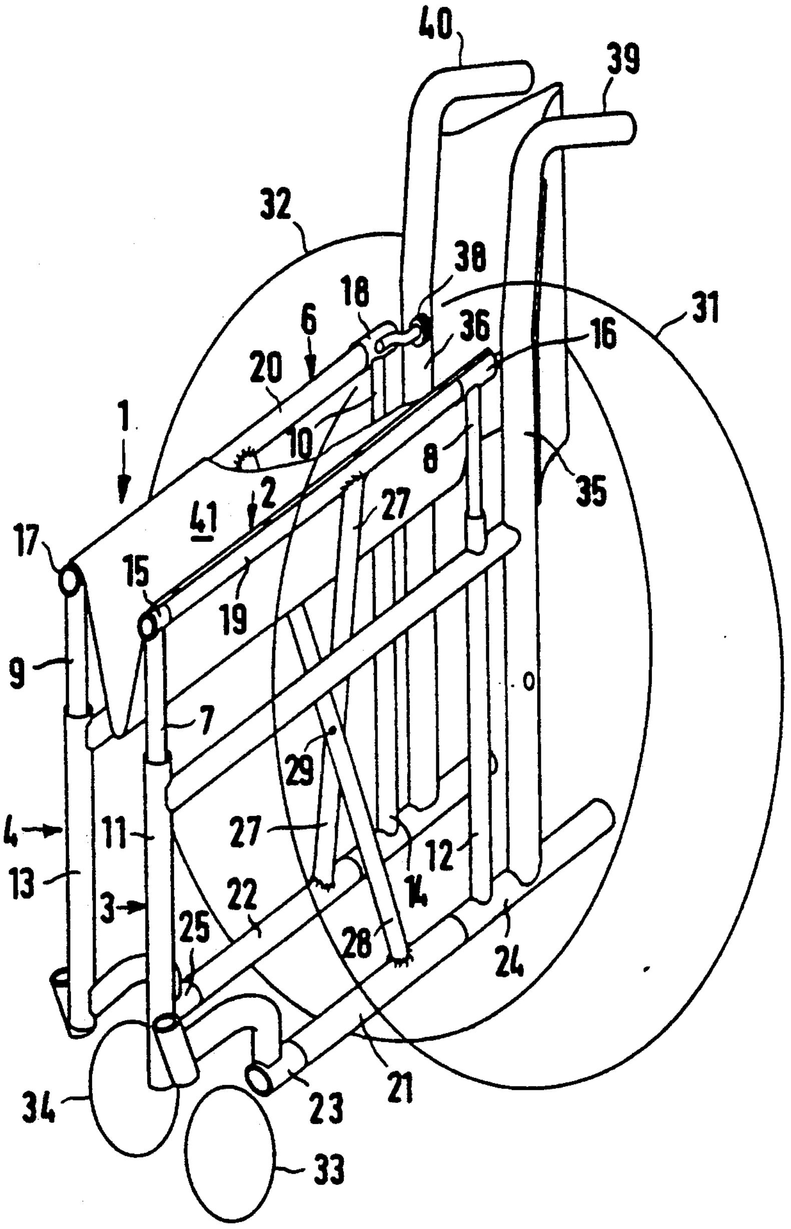
FIG. 2 is a similar view of the wheelchair according to FIG. 1 in the non-use, or collapsed, position.

The wheelchair which is shown schematically in FIGS. 1 and 2 has a pair of opposed side frames, each of which consists of spaced upper and lower horizontal tubes 1 and 4 and 2 and 3, respectively. The horizontal tubes are connected by vertical tubes 13, 14 and 11, 12, respectively. These vertical tubes also serve as sleeves which telescopically receive posts or guides 7, 8, 9, 10 as shown in FIG. 2. Seat-supporting tube 19 is connected to the tops of posts 7 and 8 for vertical movement therewith. In like manner, tube 20 is connected to the tops of posts 9 and 10. The upper ends of posts 7 and 8 or 9 and 10 preferably are welded to end sleeves 15 and 16 or 17 and 18 in which the center sections of the seat-supporting tubes 19 and 20 rotate. The axes of these short end sleeves run at right angles to the axes of the guide posts 7 to 10.

In the same manner as seat-supporting tubes 19 and 20 rotate in end sleeves 15-18, lower horizontal tubes forming part of the side frames have middle sections 21 and 22 which rotate in end sleeves 23 and 24 or 25 and 26 consisting of short tube segments. A pair of cross bars 27 and 28 are connected together in the middle like scissors by means of a mid point rotary bearing or pivot 29. The upper end of bar 27 is welded to rotatable tube 19 of the right side frame and its lower end is welded to rotatable lower tube 22 of left side frame as viewed in FIGS. 1 and 2. The other member of the scissors, bar 28, is welded to rotatable tubes 20 and 21 in opposed side frames.

Wheels 31 and 34 support the chair with the usual design and arrangement, which need not be explained further, and attach to the side frames at the bottom thereof.

Vertical shafts or tubes 35, 36 are secured to the rear of the upper and lower horizontal tubes comprising part of the side frames. Rollers 37 and 38 are mounted on offset axles welded to the outer ends of sleeves 16 and 18. The rollers roll in contact with the inside surfaces of the bearing shafts. Bearing shafts 35 and 36 continue upward over the guide segment and the curve down or are bent down so they form handles 39 and 40. A seat 41 in the form of a flexible belt extends between seat-supporting tubes 19 and 20 and is wrapped at the ends around tubes 19 and 20.

Figure 4:
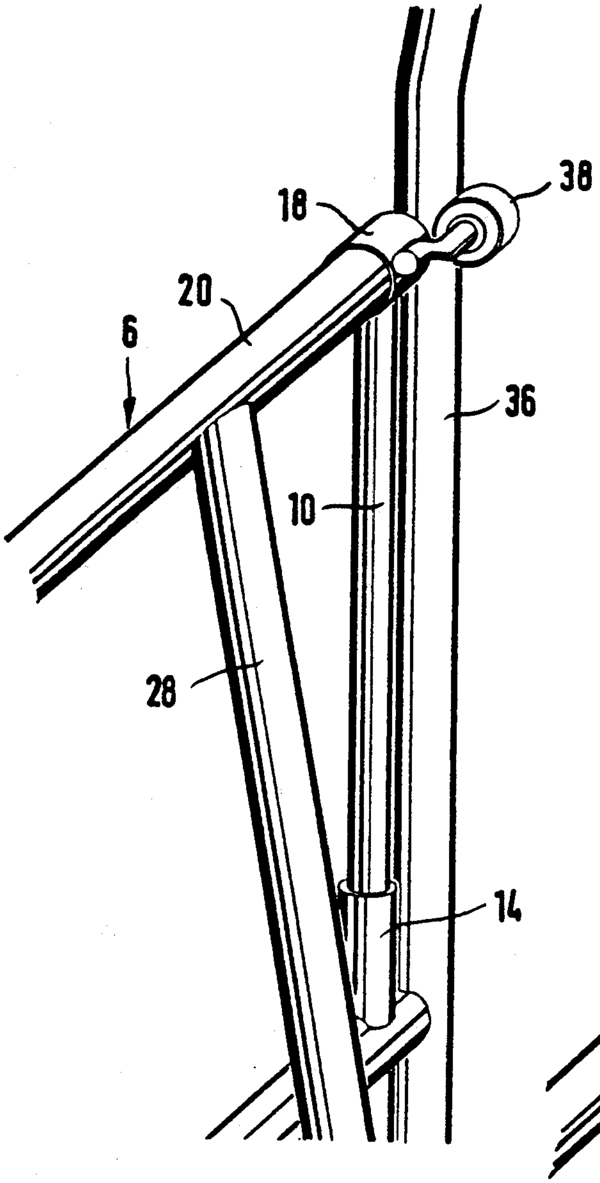
FIG. 4 is an enlarged detail of FIG. 2 in the area of the contact roller.
Figure 3:
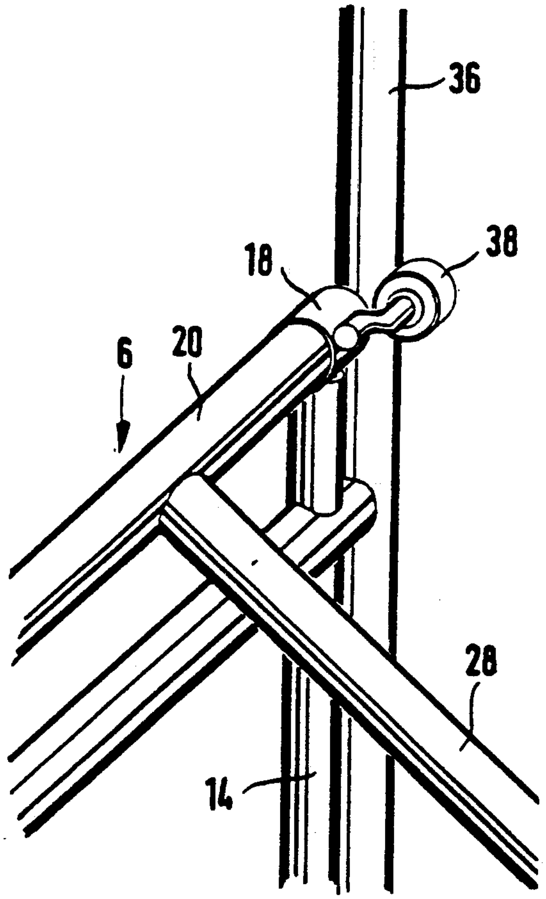
FIG. 3 is an enlarged detail of FIG. 1 in the area of the contact roller.

In FIGS. 1 and 3 of the drawings, the wheelchair is in its ready-to-use position where side frames are essentially the maximum distance apart as determined by the width of seat 41. In this position cross bars 27 and 28 are at the maximum spread; and scissors are open. In order to bring the wheelchair into the collapsed position illustrated in FIGS. 2 and 4, handles 39 and 40 are moved toward each other. Contact rollers 37 and 38 roll on the inside surfaces of bearing shafts 35 and 36, as the seat-supporting tubes move from the position in FIGS. 1 and 3 to the position in FIGS. 2 and 4. Thus all essential forces due to the folding action are transmitted largely without any friction, with the result that the wheelchair can be collapsed from the ready-to-use position into the non-use position with little effort.

Rectangular side frames and their respective horizontal and vertical members, as well as seat-supporting tubes 19, 20 need not necessarily consist of bent or welded steel tubes. They may also be flat plate-shaped side frames. The guides for the vertical posts that belong together in pairs may also have any other design with which those skilled in the art are familiar.

What is claimed is:

1. A collapsible wheelchair comprising
   a first and a second rectangular side frame, each frame having a pair of vertical tubes forming sleeves and an upper and lower horizontal tube joining said vertical tubes, said lower horizontal tubes having a rotatable middle section, a guide post telescopically disposed within each sleeve, a seat-supporting tube secured the ends of said posts above each side frame, said seat-supporting tubes having a rotatable middle section, a flexible seat member extending between said seat supporting tubes, a pair of cross bars having upper and lower ends connecting said first and second side frames together, said cross bars being interconnected like scissors by a pivot between their ends, said upper end of one cross bar being rigidly fixed to said rotatable middle section of said seat-supporting tube above said first side frame, said lower end of said one cross bar being secured to said rotatable middle section of the lower horizontal tube of said second side frame, said upper end of the other of said pair of cross bars being rigidly fixed to said rotatable middle section of said seat-supporting tube above said second side frame, said lower end of the other of said pair of cross bars being secured to said rotatable middle section of the lower horizontal tube of said first side frame, a vertical bearing shaft connected to the rear ends of said upper and lower horizontal tubes of each side frame and rising above said frames to serve as handles to manipulate the wheelchair, and a roller connected to the telescopically-disposed posts at the rear of each side frame which rollers roll against said bearing shafts as the chair is collapsed by bringing the side frames together.

2. The wheelchair of claim 1 in which the rotatable middle section of said seat-supporting tubes is mounted in end sleeves fixed to the upper ends of said guide posts, and said rollers are mounted on axles fixed to the end sleeves at the rear of said side frames, which axles are parallel to said seat-supporting tubes.

3. The wheelchair of claim 2 in which said bearing shafts have inner surfaces against which said rollers traverse when the chair is collapsed.

4. A collapsible wheelchair comprising opposed side frames, a pair of vertical guide posts slidably mounted for vertical movement on each side frame, a seat-supporting tube rotatably connected to each pair of vertical posts, a flexible seat member extending between said seat-supporting tubes, a pair of cross bars interconnected at a pivot between their ends, having upper and lower ends, one cross bar of said pair having its upper end connected to the seat-supporting tube on one side frame and its lower end having an articulated connection with said opposing side frame, the other cross bar of said pair having its upper end connected to the seat-supporting tube on the frame opposing said one side frame and its lower end having an articulated connection with said one side frame a vertical shaft connected to each of said side frames in the plane thereof, said shafts serving as handles for manipulating the wheelchair, an axle mounted adjacent said shaft on each of said seat-supporting tubes, said axle being parallel to the axis of said tubes, and rollers mounted on said axles for rolling against the surface of said shafts as the chair is collapsed and expanded by moving said side frames toward and away from each other.

* * * * *